United States Patent
Mishra (10) Patent No.: US 11,379,469 B2
(45) Date of Patent: Jul. 5, 2022

(54) TIME STAMPING OF DATA IN AN OFFLINE NODE

(71) Applicant: Schneider Electric Industries SAS, Rueil Malmaison (FR)

(72) Inventor: Sandeep Kumar Mishra, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 139 days.

(21) Appl. No.: 16/689,183

(22) Filed: Nov. 20, 2019

(65) Prior Publication Data

US 2020/0192886 A1 Jun. 18, 2020

(30) Foreign Application Priority Data

Dec. 13, 2018 (EP) ..................................... 18306680

(51) Int. Cl.
*G06F 16/00* (2019.01)
*G06F 16/23* (2019.01)
*G06F 16/27* (2019.01)
*G06F 1/12* (2006.01)

(52) U.S. Cl.
CPC ............ *G06F 16/2372* (2019.01); *G06F 1/12* (2013.01); *G06F 16/2365* (2019.01); *G06F 16/27* (2019.01)

(58) Field of Classification Search
None
See application file for complete search history.

(56) References Cited

U.S. PATENT DOCUMENTS

| 2007/0245033 | A1 | 10/2007 | Gavrilescu et al. |
| 2009/0151006 | A1 | 6/2009 | Saeki et al. |
| 2012/0069131 | A1* | 3/2012 | Abelow ............... G06Q 10/067 348/14.01 |
| 2015/0278243 | A1 | 10/2015 | Vincent et al. |

FOREIGN PATENT DOCUMENTS

| EP | 1777675 | 4/2007 |
| EP | 1887758 | 2/2008 |

OTHER PUBLICATIONS

Extended European Search Report for European Patent Application No. 18306680.2, dated Jun. 19, 2019, 10 pages.
Perrey, H., "On Secure Routing in Low-Power and Lossy Networks: The Case of RPL", Master-Thesis, Hamburg University of Applied Sciences, Faculty of Engineering and Computer Science, Department of Computer Science, Aug. 20, 2013, 104 pages.

* cited by examiner

*Primary Examiner* — Bai D Vu
(74) *Attorney, Agent, or Firm* — Locke Lord LLP (57) ABSTRACT

A method for validating timestamps issued by a first node in a communications network, when the first node goes offline. A platform detects disconnection of the first node and triggers a selected second node of the communications network to acquire counter information. When the first node reconnects to the communications network, counter information is retrieved from the second node and timestamped data is received from the first node. The local timestamp information and the counter information are compared to validate or not the local timestamp information. If the local timestamp information is validated, the data can be added to a distributed database such as a Blockchain.

19 Claims, 4 Drawing Sheets

TIME STAMPING OF DATA IN AN OFFLINE NODE

TECHNICAL FIELD

The invention concerns time stamping of data issued by industrial devices, in particular, for storage of such time-stamped data.

BACKGROUND

In industrial systems, data can be issued by many different types of devices, such as sensors, for example Zig Bee sensors, controllers, Programmable Logic Controllers, PLCs, drives and Human-Machine Interface, HMI.

Figure 1:
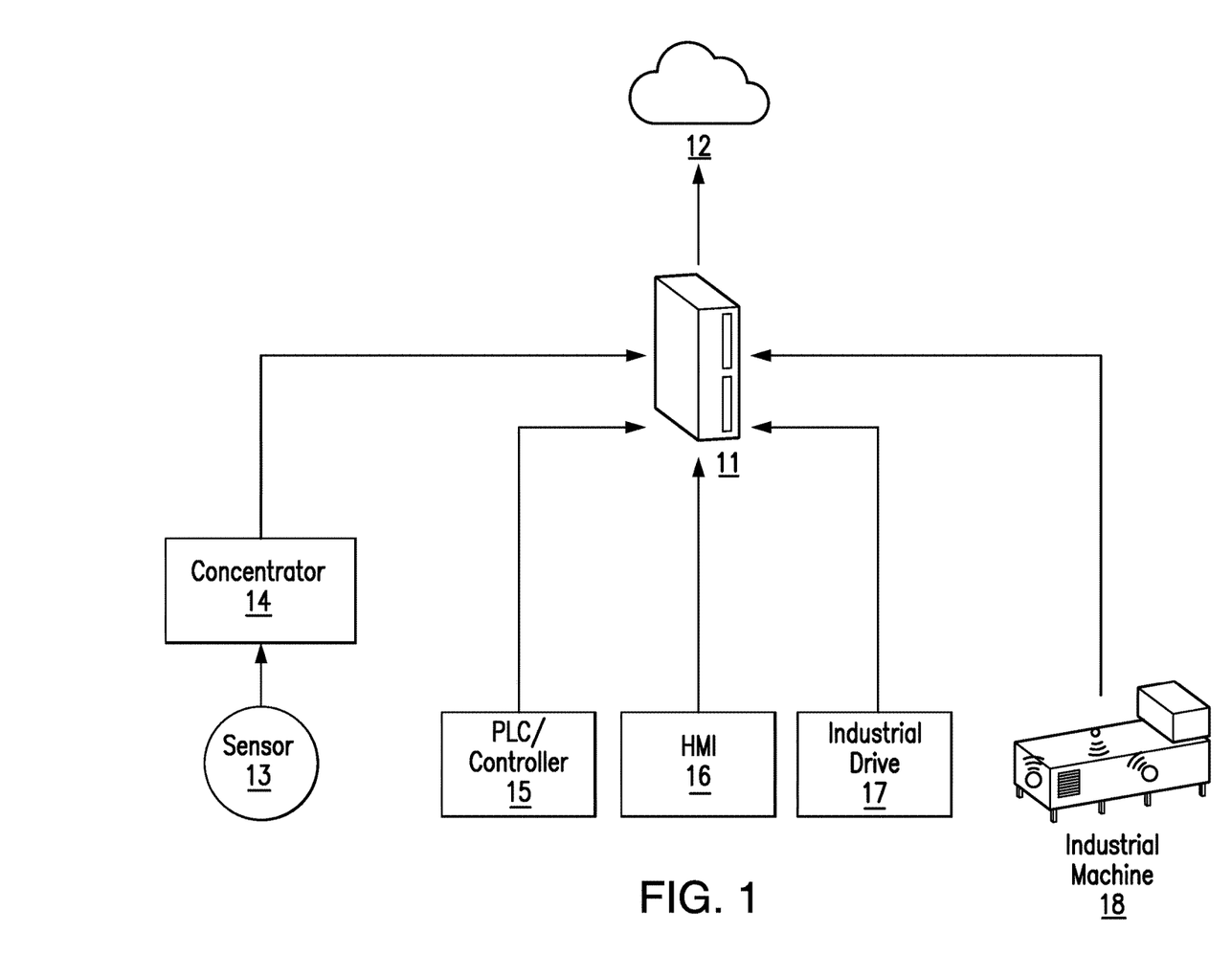
FIG. 1 represents a system according to the prior art.

Referring to FIG. 1, there is shown an industrial system with a time stamping mechanism according to the prior art.

The system comprises a control entity 11 that may be a gateway, a Supervisory Control And Data Acquisition, SCADA, server or a PLC. The control entity 11 receives data from a plurality of devices, such as sensors 13 and concentrators 14, a PLC/controller 15, an HMI 16, an industrial drive 17 and an industrial machine 18.

One control entity 11 manages the devices of an industrial building or factory, such as a plant for example, or is common to devices located in several industrial buildings/factories.

The devices may have their own clock to timestamp the data that are transmitted to a cloud platform 12 via the control entity 11. However, some of the industrial devices do not have their own clock. In addition, even if several of the devices have their own clocks, the respective clocks are generally not well synchronized, and time stamping processes are not synchronous.

Alternatively, or in complement, at least some of the devices do not have their own clock so that their data is timestamped by the control entity 11, using a Real Time Clock for example.

Also, the cloud platform 12 may have its own timestamp mechanism to timestamp data received from the devices via the control entity 11.

If communication between the cloud platform 12 and the control entity 11 is interrupted, data received from the devices and not yet transmitted to the cloud platform 12 can be locally stored in a database of the control entity 11. In that case, data is to be locally time stamped (by the devices or by the control entity 11). The stored and timestamped data can be pushed later to the cloud platform 12, when connection between the cloud platform 12 and the control entity 11 is re-established.

However, as time at the control entity 11 or at the devices can be easily modified, there is no way to ensure that time stamps have not been altered or tampered with.

In addition, if a device is rented by an Original Equipment Manufacturer, OEM, the actual run hour of the device cannot be guaranteed if the connection to the cloud platform 12 is interrupted several times or has been modified by a user of the device during a warranty period.

There are therefore needs to ensure integrity of the timestamping process of data acquired by devices, and more generally by nodes of a communications network, even more when such devices are rented by the OEM to the user.

SUMMARY

A first aspect of the invention concerns a method for validating data provided by a node in a communications network, comprising the following operations:

upon detection that a first node is disconnected from the communications network, selecting at least one second node of the network;

sending a request to the selected at least one second node of the communications network, said request triggering acquisition of counter information;

upon detection that the first node re-connects to the network, retrieving counter information from the second node;

receiving data from the first node, the data being associated with local timestamp information;

validating the local timestamp information based on a comparison between the local timestamp information and the retrieved counter information.

A node designates any entity that is configured to access to the communications network, either directly or via a platform, and that is configured to gather data. The node may be embedded in a device such as a sensor collecting data, a concentrator, a PLC/controller, an HMI, an industrial drive and an industrial machine, or a central entity, such as an IoT box, collecting data from several devices as mentioned above. First and second nodes may correspond to the light nodes described hereafter.

The present invention therefore enables to implement verification of the timestamping process that is performed off-line by the first node. It prevents timestamps to be manipulated by a third party or a user when the first node is offline. This increases the robustness of the timestamping process. In addition, if a device embedding the first node is rented by an Original Equipment Manufacturer, OEM, the actual run hour of the first node can be guaranteed even if the connection to the communications network is interrupted.

According to some embodiments, the communications network may comprise a distributed database, the method being carried out in a platform storing the distributed database, and, upon validation of the local timestamp information, the received data is added to the distributed database.

In that context, the first node may access to the communications network via the platform. The first node may be regarded as a light node for the distributed database in that it stores only a part of the distributed database or does not store it at all. It is however configured to push data to be stored in the distributed database and to run a counter to obtain timestamps. It may further comprise processing means to determine hash values, particularly in the context of a distributed database being a blockchain.

These embodiments enable to enhance the integrity of the data that is added to the distributed database.

According to some embodiments, the distributed database may be a blockchain.

Blockchain is a technology that provides a high level of trust.

According to some embodiments, the counter information comprises several timestamp values and the comparison comprises verifying that the local timestamp information corresponds to one of the timestamp values.

This enables to ensure that the timestamp values have not been modified during disconnection of the first node.

Alternatively or in complement, the counter information and the local timestamp information may comprise respective disconnection durations.

The comparison may therefore be based on the disconnection durations.

According to some embodiments, the comparison is further based on respective time offsets of the first node and of the second node.

This enables to take into account the different time offsets/delays of the network, and to increase the accuracy of the comparison.

In complement, the time offset of the first node may be representative of a first transmission time between the first node and the platform, and the time offset of the second node may be representative of a second transmission time between the second node and the platform.

According to some embodiments, each node of the network may be identified by a respective signature, and the at least one second node may be selected by applying a set of rules to a first signature of the first node.

This enables to perform a relevant selection of the second node to improve the integrity of the timestamping process.

In complement, the signature may be at least based on a geo-localization of the node and the second node may be selected among nodes having a geo-localization that is different from a geo-localization of the first node.

This enhances the integrity of the timestamping process as it makes it even more difficult for a third party to manipulate both the local timestamp information on the first node and the counter that is run by the second node.

Alternatively, or in complement, the signature of each node may be further based on fingerprint data, a device identifier and/or an IP address of the node.

Fingerprint data may be uniquely associated with a device identifier. This enables to reinforce the consensus mechanism as it may ensure that the counter information is issued by different devices belonging to different users. For example, it can prevent that two devices belonging to the same user are selected as second nodes. To this end, fingerprint data may be associated in the cloud with corresponding users, in a list or table for example.

This enables to perform a relevant selection of one or several second nodes, and therefore to reinforce the integrity associated with the timestamp process.

According to some embodiments, several second nodes may be selected and the local timestamp information may be validated based on counter information retrieved from the several second nodes.

For example, an even number of second nodes can be selected. This enables to ensure that a consensus is reached because then, the number of first and second nodes is odd. Therefore, it can always be determined whether the timestamp should be trusted or not (assuming that the first node "votes" for the timestamp to be trusted). Alternatively, if the "vote" of the first node is not counted, an odd number of second nodes can be selected to reach a consensus.

According to some embodiments, the local timestamp information may be validated if at least the majority of retrieved counter information matches with the local timestamp information associated with the received data.

According to some embodiments, if the local timestamp information is not validated, the method may further comprise synchronizing a clock of the first node with a reference clock.

In complement, the platform may be synchronized with the reference clock.

This enables to synchronize the first node with the platform. Then, in case of further disconnection of the first node, the integrity of the local timestamp information of the first node is ensured.

A second aspect of the invention concerns a non-transitory computer readable storage medium, with a computer program stored thereon, said computer program comprising instructions for, when executed by a processor, carrying out the steps of a method according to the first aspect of the invention.

A third aspect of the invention concerns a platform comprising:
- a first interface for communicating with at least one node in a local network;
- a second interface for communicating with at least one other platform via a communications network;
- a processor configured for:
  - detecting that a first node of the local network is disconnected from the platform;
  - upon detection that a first node is disconnected from the platform, selecting at least one second node in the local network or via the communications network;
  - sending, via one of the first and second interface, a request to the at least one second node, said request triggering acquisition of counter information at the second node;
  - upon detection that the first node re-connects to the platform, retrieving counter information from the second node.

After detection that the first node re-connects to the platform, the first interface is configured for receiving data from the first node, the data being associated with local timestamp information and the processor is configured for validating the local timestamp information based on a comparison between the local timestamp information and the retrieved counter information.

According to some embodiments, the platform may further comprise a storage configured for storing a copy of a distributed database and, upon validation of the local timestamp information, the processor may be further configured to push the validated data to be stored in the distributed database.

Further objects, aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawings, wherein.

DETAILED DESCRIPTION

Figure 2:
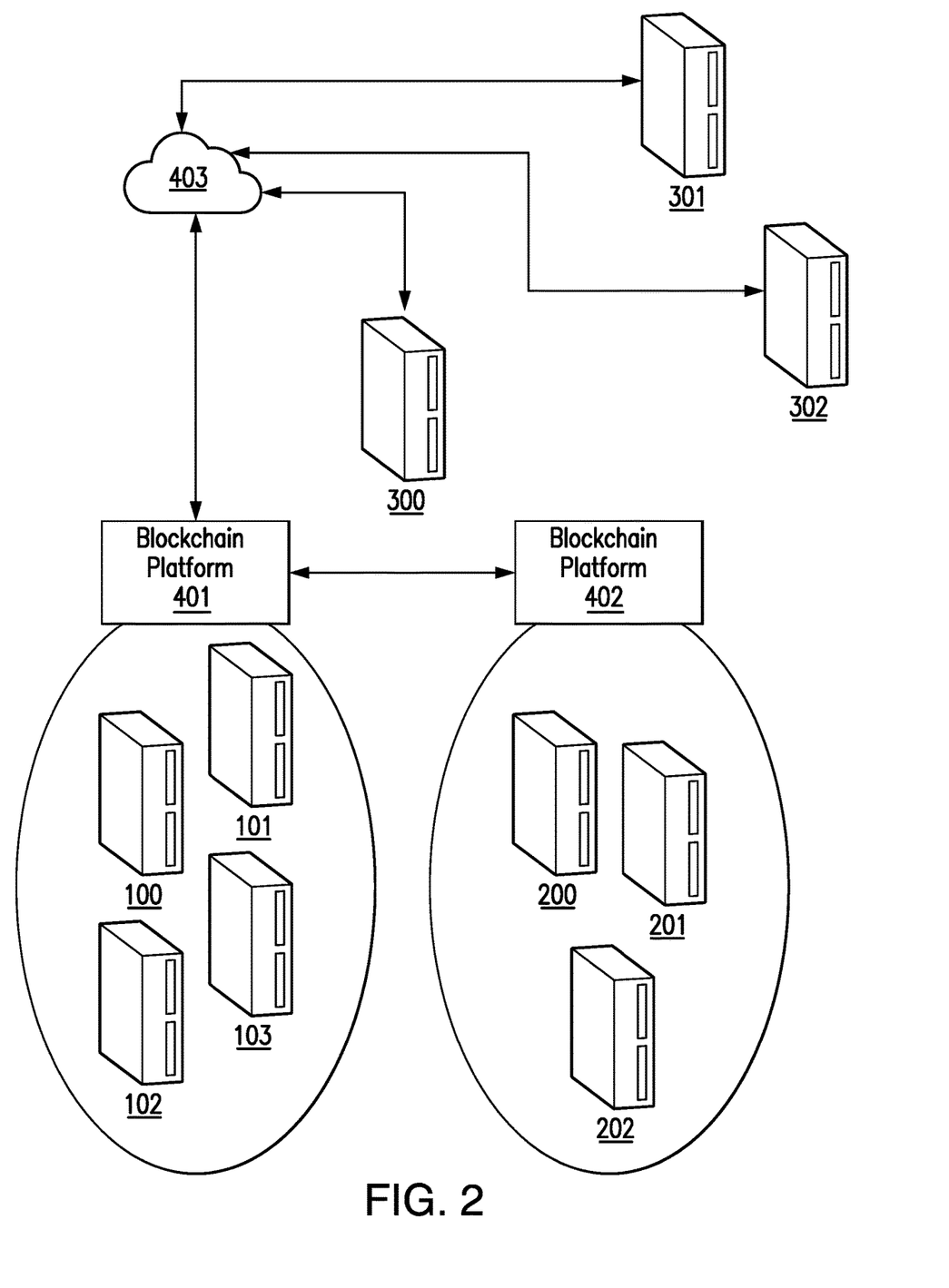
FIG. 2 represents a system according to some embodiments of the invention.

FIG. 2 shows a system according to some embodiments of the invention.

The system comprises a plurality of light nodes, or light client nodes, each light node being embedded in a control entity that is configured for receiving data from one or several devices. In what follows, the control entity and the embedded light node running on said control entity are interchangeably referred to. The light nodes can be grouped in groups of light nodes, based on their respective locations for example. For example, a group of light nodes can correspond to a given factory. A light node can be an IT/OT box or any control entity that is linked to one or several industrial devices.

A first group of light nodes comprises light nodes 100, 101, 102 and 103, which may be grouped in a same first factory for example. The first group of light nodes may be grouped in a local network. In addition, the first group is associated with a first platform 401, such as a Blockchain platform, in charge of storing a distributed database and in charge of performing further functionalities that will be described hereafter. The distributed database is considered as a Blockchain database in what follows, for illustrative purposes. However, the invention applies to any system involving a distributed database. The first platform interfaces between the local network comprising the first group of light nodes and the communications network.

A blockchain is a distributed database that consists of an ordered chain of blocks, each block comprising hashed data. A block n also comprises the hash value of the data hashed for the previous block n−1. The blockchain is then shared among all the full nodes of the network and is updated in all the full nodes each time a new block is added and validated by all the full nodes, via a process called "proof of work" or "proof of stake" or any other validation algorithm. As it is extremely challenging, let us say impossible, to modify the blocks once validated and shared between all the full nodes, blockchain ensures integrity of the data stored in all the blocks.

A light node of a distributed database is, according to the invention, any entity that is able to acquire data, that runs a local counter to obtain timestamps and that accesses a full node such as the blockchain platforms or cloud 403. A light node may also comprise processing means for hashing the data and timestamps.

A second group comprises light nodes 200, 201 and 202. In addition, the second group is associated with a Blockchain platform 402.

A third group comprises light nodes 300, 301 and 302. No blockchain platform is locally dedicated to the third group. However, each light node of the third group may access to a Blockchain platform hosted in a cloud 403.

No restriction is attached to the number of light nodes that are comprised in a group. Also, a group may comprise light nodes at different locations, and may for example comprise several light nodes of a same user.

The light nodes may be embedded in edge gateways such as IT/OT boxes. IT/OT boxes refer to interfaces between an OT network comprising industrial devices and a telecommunication network such as the Internet.

The blockchain database is distributed among blockchain nodes, or "full nodes", comprising the blockchain platforms 401 and 402 and in the cloud 403, that can be accessed by the light nodes. All the blockchain full nodes store the same version of the blockchain, and update the blockchain at the same time when a block is added to the blockchain.

The light nodes however, do not store the whole blockchain (only stores a part of it or does not store it at all). They however participate to the blockchain as they push data to be added to the blockchain, run local counters that are synchronized with the full nodes and may comprise processing means. The light nodes may feed data to the blockchain via the blockchain platforms 401, 402 or via the cloud 403.

The invention enables to maintain synchronization of the light nodes and to ensure integrity of the timestamps of data that is stored in the blockchain, even in the event where a light node cannot access to the blockchain.

According to the invention, each of the light nodes comprises a clock. A counter can be run by each of the light nodes, and the counter can be carried out by hardware or software means. No restriction is attached to the clock, which may have certified time provided by a service company using an astronomical clock or national standard clock. Counters can be started at the beginning of each day for example, or more generally at a given period. A certificate may for example be generated at a factory level, by the blockchain platform 401 for example, and propagated to the light nodes 100, 101, 102 and 103. The light nodes 200, 201 and 202 may be synchronized via the second blockchain platform 402 and the light nodes 300, 301 and 302 may be synchronized via the cloud 403. Synchronization may involve determining time offset/delays, between the light nodes and their associated full node.

Figure 3:
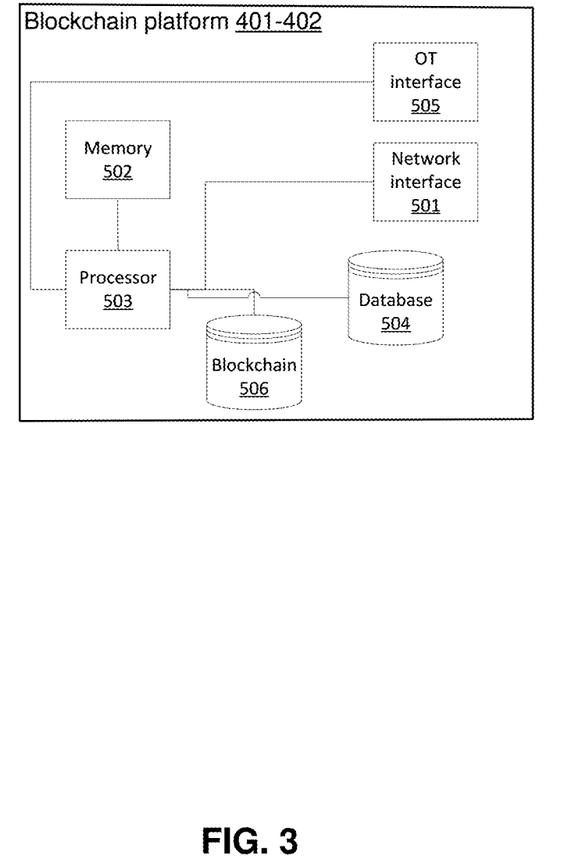
FIG. 3 represents the structure of a platform according to some embodiments of the invention.

According to some embodiments of the invention, each blockchain platform may have the structure that is detailed on FIG. 3.

Figure 4:
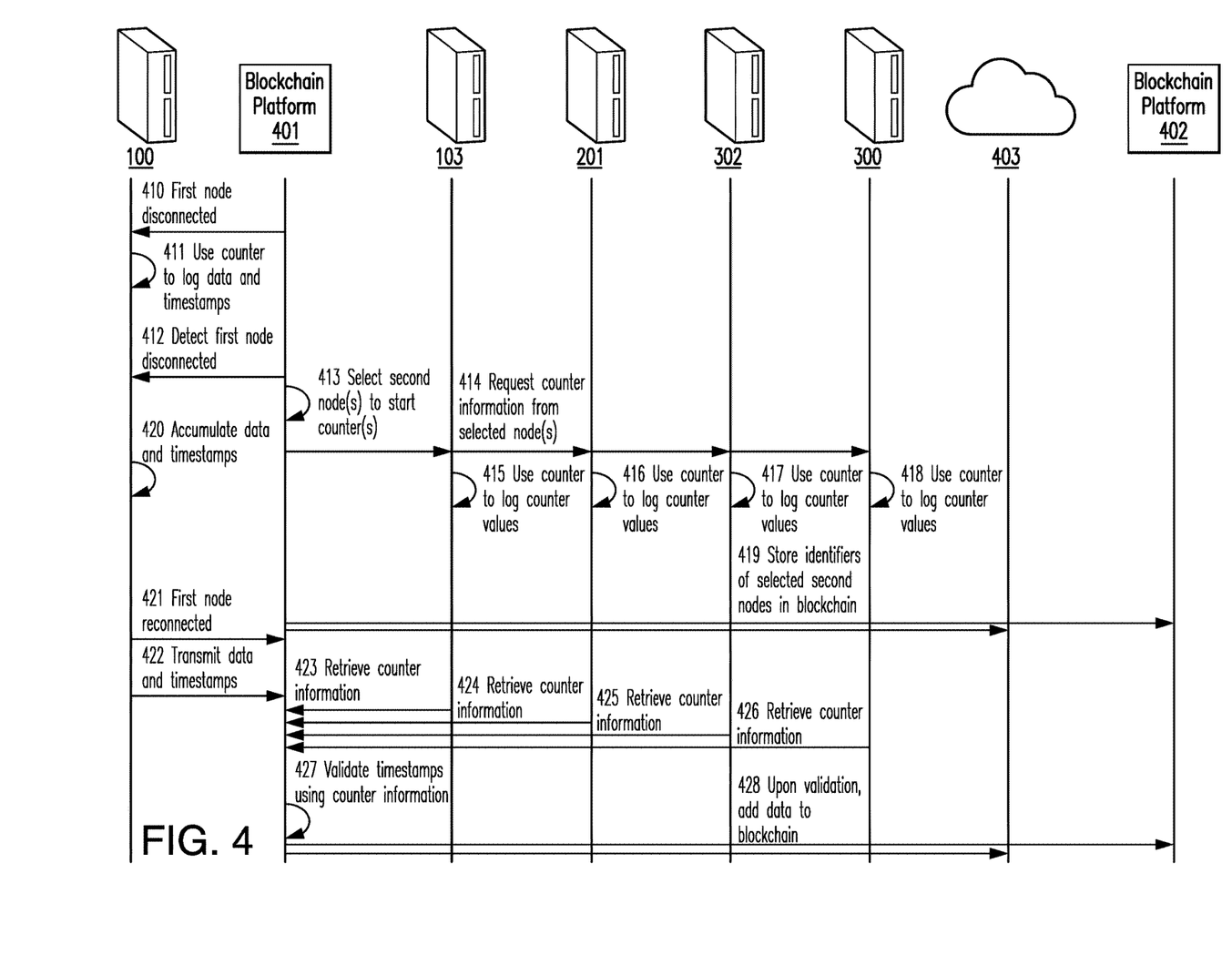
FIG. 4 is a diagram showing steps of a method according to some embodiments of the invention.

The blockchain platform comprises a memory such as a Random Access Memory, RAM, and/or a Read Only Memory ROM, and a processor 503 arranged for executing instructions for implementing the steps of FIG. 4 that are carried out by the blockchain platform. Instead of the structure illustrated on FIG. 3, the blockchain platform may comprise a dedicated electronic circuit that is designed to perform the steps of FIG. 4 that are carried out by the blockchain platform.

The blockchain platform stores a blockchain 506, as explained above. The same version of the blockchain 506 is shared among all the full nodes of the blockchain, and may be regularly updated to add new blocks.

The blockchain platform further comprises a database 504, which can be regarded as an "off-chain database", the blockchain 506 being in contrast regarded as an "on-chain database". The database is configured for storing some of the data used during execution of the method according to the invention. In particular, while not exclusively, the database 405 may store sets of rules/mathematical algorithm for selecting light nodes when one light node is disconnected, as will be explained hereafter.

The blockchain platform further comprises a network interface 501 arranged for enabling communications through a network such as an IP network for example. The network interface 501 enables in particular to communicate with the other full nodes of the blockchain.

The blockchain platform further comprises an Operational Technology, OT, interface 505 arranged for communicating with the light nodes associated with the blockchain platform. For example, for the blockchain platform 401, the OT interface 505 is arranged for communicating with the light nodes 100, 101, 102 and 103.

FIG. 4 is a diagram showing the operations of a method according to some embodiments of the invention.

In a preceding situation (before a current situation described hereafter), it is considered that all the light nodes are online, meaning that they have access to the blockchain, whether via one of the blockchain platforms 401 and 402, or via the cloud 403. In the preceding situation, the system clocks of the light nodes are synchronized. In particular, we assume that the system clocks of all the light nodes (i.e. astronomical clock or national clock) are synchronized with the blockchain platforms 401, 402 and the cloud 403. Also, each time delay (or offset) between a light node and the corresponding blockchain platform may be known and stored in the full nodes. Counters are then run in every light node, each counter being started at the same time, for example at the beginning of each day.

At step 410, the light node 100, also called first light node 100 hereafter, is disconnected from the first blockchain platform 401 during a current situation. Upon detection of the disconnection, the light node 100 uses its running counter to create a log file with the data that is acquired, at step 411. The log file may be updated with acquired data, corresponding counter values that are considered as local timestamps, and optionally with a device identifier. The updates of the log file may be stopped only when the first light node reconnects the first blockchain platform 401. For example, data may be acquired every second, and stored in the log file in association with a corresponding counter value.

At step 412, the first blockchain platform 401 detects that the first light node 100 is disconnected and executes a rule engine/mathematical algorithm at step 413 to select at least one second light node among the other light nodes shown on FIG. 2. The rule engine/mathematical algorithm may be implemented by providing instructions to the processor and accessing the database 504 storing sets of rules/mathematical algorithm. Upon execution of the rule engine, at least one other light node is selected to start a counter. According to some embodiments, several light nodes are selected. For example, an even number of light nodes is selected.

No restriction is attached to the rules/mathematical algorithm that are used to select the other light nodes. For example, selection of the other light nodes may be based on random probability or on a gossip protocol.

According to some embodiments of the invention, the other light nodes are selected based on a signature of the first light node 100. The signature of the first light node 100 may depend on:
  geolocalization data from a geolocalization sensor of the first light node 100;
  device identifier of the first light node 100;
  user data from a fingerprint sensor of the first light node 100;
  IP address of the first light node 100; and/or
  other unique identifier related to the first light node 100.

These data are known by the first blockchain platform 401 because the first blockchain platform is in charge of the first group of light nodes and may therefore store such data for each of the light nodes 100, 101, 102 and 103. These data can be obtained by the first blockchain platform 401 during an initial phase of registration of a light node (during commissioning of the light nodes for example). Also, these data may be accessible in the blockchain, so that each of the blockchain platforms may access to the data related to each of the light nodes 100, 101, 102, 103, 200, 201, 202, 300, 301 and 302. For example, the whole topology of the system illustrated on FIG. 2 can be stored in the blockchain.

For example, to improve the level of trust associated with the method according to the invention, at least one of the selected second light nodes has a geolocalization that is different from the geolocalization of the first light node 100. This means that at least one of the second light nodes that are selected (and preferably a majority of them), does not belong to the first group of light nodes 100, 101, 102 and 103. This makes it difficult for a third party to manipulate both the first light node 100 and some of the selected second nodes. Also, if the first light node 100 is rented by an Original Equipment Manufacturer, OEM, the actual run hour of the first light node 100 can be guaranteed even if the connection to the cloud 403 is interrupted several times.

In what follows, we assume that the first blockchain platform 401 selects light node 103, light node 201 and light nodes 300 and 302 as selected second nodes, at step 413. Therefore, a majority of the selected second nodes does not belong to the first group of light nodes to which the first light node 100 belongs.

At step 414, the first blockchain platform 401 sends requests for counter information to the selected second light nodes 103, 201, 300 and 302. Light nodes 201, 300 and 302 can be reached via the second blockchain platform 402 and via the cloud 403.

Each of the selected second light nodes then uses its internal running counter at respective steps 415, 416, 417 and 418, to create and update log files comprising counter values and optionally time offsets/delays. The log file comprises values of the counter starting when the request is received from the blockchain platform at step 414.

At step 419, the first blockchain platform 401 may store identifiers of the second selected light nodes 103, 201 and 302 in a new block of the blockchain, which is stored in the second blockchain platform 402 and in the cloud 403.

At step 421, the first light node 100 connects again to the first blockchain platform 401. The first light node 100 may then stop updating the log file and may hash it. The log file may also be hashed with a light node identifier, time offset and/or duration of disconnection. The hash may be considered as local timestamp for data that has been acquired by the first light node 100 during disconnection. Time offset (or delay) may correspond to a time for an information to be exchanged between the first light node 100 and the blockchain platform 401, when they are connected to each other.

Between steps 410 and 421, all the light nodes of the first group are synchronized with the first blockchain platform 401, except the first light node 100, which is disconnected.

Between steps 410 and 421, at step 420, the first light node 100 has accumulated data associated with local timestamps and stored in the log file. The data may be related to critical production or may be quality data, issued from sensors, PLC or HMI for example. HMI enables for an operator to enter quality data and local information.

After it reconnects to the first blockchain platform 401, the data and the associated timestamps are transmitted to the first blockchain platform 401 at step 422, for example in the form of a hashed log file.

The first blockchain platform 401 retrieves counter information from the other light nodes 103, 201, 300 and 302, which had been previously selected, at steps 423, 424, 425 and 426. After that, the other light nodes 103, 201, 300 and 302 may stop updating their respective log files, calculate a disconnection duration, and send them to the first blockchain platform 401. The log files may also be hashed, optionally with device identifiers, time offset and/or disconnection duration, and the hash is considered as counter information to be transmitted to the first blockchain platform 401. Optionally, only the disconnection duration or only the log file may be sent to the first blockchain platform 401 as counter information, by each of the selected second nodes.

At step 427, the first blockchain platform 401 or the cloud 403 determines whether the timestamps are validated or not, based on a comparison between the timestamps received from the first light node 100 and on the retrieved counter information from the selected second nodes. Such comparison may comprise:
  comparing the disconnection durations received respectively from the first light node 100 and from each of the selected second light nodes; and/or
  comparing the respective counter values of the log file of the first light node 100 and of the log file of each of the selected second light nodes. To perform such comparisons, the respective time offsets may be taken into account, as the time offsets may vary. For example, the time offset between the first light node 100 and the first blockchain platform 401 may be equal to 8 ms, whereas the time offset between the second light node 103 and the first blockchain platform 401 may be equal to 16 ms.

Validation can be performed using a consensus mechanism, according to which strictly more than 50% of the counter information retrieved from the selected other nodes has to be consistent with the local timestamps associated with the data (disconnection durations are equal and/or counter values are consistent in the log files). For example, if disconnections durations of the first light node 101 is equal to disconnection durations of the second light nodes 103, 300 and 302, but is different from disconnection duration obtained from second light node 201, then the local timestamp is validated, of flagged as "trusted".

If the local timestamp is validated, then the data is added to the blockchain at step 428. Else, a process of synchronizing the system clock of the light node 101 is carried out and the data can be flagged as "untrusted". Once the light node 101 is synchronized again, a complete record of certified timing may be hashed in the blockchain.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for validating data in a communications network, comprising:
    upon detection that a first node is disconnected from the communications network, selecting at least one second node of the communications network;
    sending a request to the selected at least one second node of the communications network, said request triggering acquisition by the at least one second node of counter information comprising a timestamp provided by a respective counter of each of the at least one second node;
    upon detection that the first node re-connects to the communications network, retrieving, from the at least one second node, the counter information, and receiving, from the first node, local timestamp information and data associated with the local timestamp information, the local timestamp information comprising a timestamp local to the first node; and
    validating the local timestamp information based on a comparison between the local timestamp information and the counter information, wherein the local timestamp information is validated when the comparison determines that the local timestamp information matches the counter information.

2. The method according to claim 1, wherein the communications network comprises a distributed database, the method being carried out in a platform storing said distributed database;
    wherein upon validation of the local timestamp information, the received data is added to the distributed database.

3. The method according to claim 2, wherein the distributed database is a blockchain.

4. The method according to claim 1, wherein the counter information comprises several timestamp values and the comparison comprises verifying that the local timestamp information corresponds to one of the timestamp values.

5. The method according to claim 1, wherein the counter information and the local timestamp information comprise respective disconnection durations.

6. The method according to claim 1, wherein the comparison is further based on respective time offsets of the first node and of the at least one second node.

7. The method according to claim 6, wherein the time offset of the first node is representative of a first transmission time between the first node and the platform, and wherein for each second node of the at least one second node, the time offset of the second node is representative of a second transmission time between the second node and the platform.

8. The method according to claim 1, wherein each node of the first node and the at least one second node is identified by a respective signature, and wherein the at least one second node is selected by applying a set of rules to the signature of the first node.

9. The method according to claim 8, wherein for each node of the first node and the at least one second node the signature is at least based on a geo-localization of the node, wherein at least one of the at least one second node is selected among nodes having a geo-localization that is different from a geo-localization of the first node.

10. The method according to claim 8, wherein the signature of each node of the first node and the at least one second node is further based on fingerprint data, a device identifier and/or an IP address of the node.

11. The method according to claim 1, wherein the at least one second node is several second nodes and wherein the local timestamp information is validated based on the counter information retrieved from the several second nodes.

12. The method according to claim 1, wherein the local timestamp information is validated if upon determining that at least a majority of retrieved counter information match with the local timestamp information.

13. The method according to claim 1, further comprising:
    upon determining that the local timestamp information is not validated, synchronizing a clock of the first node with a reference clock.

14. A non-transitory computer readable storage medium, having a computer program stored thereon, said computer program comprising instructions which when executed by a processor, cause the processor to perform the method according to claim 1.

15. A platform comprising:
    a first interface for communicating with at least one node in a local network;
    a second interface for communicating with at least one other platform via a communications network;
    a processor configured for:
        detecting that a first node of the local network is disconnected from the platform;
        upon detection that the first node is disconnected from the platform, selecting at least one second node in the local network or via the communications network;
        sending, via one of the first and second interfaces, a request to the at least one second node, said request triggering acquisition by the at least one second node of counter information comprising a timestamp provided by a respective counter of each of the at least one second node;

upon detection that the first node re-connects to the platform, retrieving the counter information from the at least one second node;

wherein, after detection that the first node re-connects to the platform, the first interface is configured for receiving, from the first node, local timestamp information and data associated with the local timestamp information, the local timestamp information comprising a timestamp local to the first node;

wherein the processor is configured for validating the local timestamp information based on a comparison between the local timestamp information and the counter information, wherein the local timestamp information is validated when the comparison determines that the local timestamp information matches the counter information.

16. The platform according to claim 15, further comprising a storage configured for storing a copy of a distributed database;

wherein, upon validation of the local timestamp information, the processor is further configured to push the data to be stored in the distributed database.

17. A communication network, comprising multiple nodes and the platform according to claim 15.

18. A method for validating data in a communications network, comprising:

upon detection that a first node is disconnected from the communications network, selecting at least one second node of the communications network;

sending a request to the selected at least one second node of the communications network, said request triggering acquisition of counter information comprising a disconnection duration of the first node;

upon detection that the first node re-connects to the communications network, retrieving, from the at least one second node, the counter information, and receiving, from the first node, local timestamp information and data associated with the local timestamp information, the local timestamp information comprising a disconnection duration of the first node; and validating the local timestamp information based on a comparison between the local timestamp information and the counter information, wherein the local timestamp information is validated when the comparison determines that the disconnection duration of the first node as retrieved from the at least one second node equals the disconnection duration of the first node as received from the at least one second node.

19. A platform for validating data in a communications network, the platform comprising:

a processor and a memory, the processor configured to execute instructions for implementing the method according to claim 18.

* * * * *